UNITED STATES PATENT OFFICE.

GEORG KRÄNZLEIN, OF HÖCHST-ON-THE-MAIN, GERMANY, ASSIGNOR TO FARBWERKE VORM. MEISTER LUCIUS & BRÜNING, OF HÖCHST-ON-THE-MAIN, GERMANY, A CORPORATION OF GERMANY.

SALMON-COLORED VAT DYESTUFF AND PROCESS OF MAKING SAME.

1,025,195.
No Drawing.
Specification of Letters Patent.
Patented May 7, 1912.
Application filed June 21, 1910. Serial No. 568,100.

*To all whom it may concern:*

Be it known that I, GEORG KRÄNZLEIN, Ph. D., chemist, a citizen of the Empire of Germany, residing at Höchst-on-the-Main, Germany, have invented certain new and useful Improvements in Salmon-Colored Vat Dyestuff and Processes of Making Same, of which the following is a specification.

I have found that β-anthraquinonyl-urea-chlorid and other bodies of the general formula

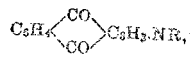

in which "R" stands for a derivative of formic acid, can be transformed into a reddish-brown vat dyestuff dyeing cotton salmon-colored tints, insoluble in alkalis and of hitherto unknown constitution, by heating them with a dry alkaline or neutral condensing agent.

In order to carry out this process, I can, for instance, proceed as follows:—29 kg. of β-anthraquinonyl-urea-chlorid, obtainable by introducing phosgen into a cold or hot suspension of β-amino-anthraquinone in nitrobenzene, are heated to boiling in the said nitrobenzene suspension with 29 kg. of anhydrous sodium acetate for about one hour. After cooling, the mass is filtered off and washed with alcohol and water. The dyestuff thus obtained forms, when dry, a reddish-brown powder, insoluble in water, alcohol, ether, benzene, nitrobenzene, dilute acids and alkalis; dissolving in concentrated sulfuric acid with an emerald-green to blue-green color which upon heating turns to a pure blue color, unlike the β-anthraquinonyl-urea-chlorid, which dissolves with a light-yellow color. The new dyestuff gives in presence of alkaline hydrosulfite a reddish-brown vat and dyes from this vat, particularly cotton, salmon-colored tints of excellent fastness to washing, to light and chlorin. In the place of β-anthraquinonyl-urea-chlorid, there may be used β-anthraquinonyl-isocyanate; or the β-β-dianthraquinonyl-urea disclosed in U. S. Patent No. 958,325. Furthermore, there may be substituted for the sodium acetate, formates, carbonates or the like.

Having now particularly described my invention, what I claim is:

1. The process of manufacturing a new vat dyestuff dyeing cotton salmon-colored tints, which consists in heating a product of the general formula

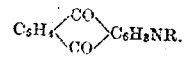

in which "R" stands for a derivative of formic acid, and an alkaline condensing agent.

2. The process of manufacturing a new vat dyestuff dyeing cotton salmon-colored tints, which consists in heating β-anthraquinonyl-urea-chlorid and an alkaline condensing agent.

3. As a new product, the vat dyestuff hereinbefore described, being a reddish-brown powder, insoluble in water, alcohol, ether, benzene, nitrobenzene, dilute acids and alkalis; soluble in concentrated sulfuric acid with an emerald-green to blue-green coloration which upon heating turns to a pure blue color; yielding when treated with an alkaline reducing agent like hydrosulfite, an orange-brown vat from which cotton is dyed salmon-colored tints of excellent fastness to washing, light and chlorin.

In testimony whereof, I affix my signature in presence of two witnesses.

GEORG KRÄNZLEIN.

Witnesses:
JEAN GRUND,
CARL GRUND.